Patented June 1, 1954

2,680,070

UNITED STATES PATENT OFFICE 2,680,070

STAINLESS STEEL MELTING PROCESS

Donald L. Loveless, Baltimore, Md., assignor to Armco Steel Corporation, a corporation of Ohio No Drawing. Application August 25, 1950, Serial No. 181,565

4 Claims. (Cl. 75—12)

My invention relates generally to the production of stainless steel and particularly to a process of producing steel of the general type described, wherein I employ chrome ore as a substantial source of the required chromium content.

An object of my invention is the production, in highly efficient and thoroughly reliable manner, of stainless steel responding consistently to desired analysis of alloy content, which metal displays uniform density and is characterized by substantial absence of sponginess, gasiness or porosity, the aforementioned objectives being achieved by the use of inexpensive and readily available raw materials.

Another object is the production of steel of the general type indicated in which, without sacrifice in the required good qualities of the ultimate product, all necessity is avoided of pre-drying and pre-treating the raw materials employed, all with attendant saving in operational time and with certainty and consistency of ultimate analysis within required close limits.

Yet another object is the production of stainless steel utilizing known and readily available, tried and proved furnacing and operating equipment.

Other objects of my invention, together with certain important and highly practical advantages thereof, will in part be obvious and in part pointed out hereinafter during the course of the following description.

My invention accordingly may be seen to reside in the several operational, procedural and manipulative steps, as well as in the relation and combination of each of the same with one or more of the others, the scope of the application all of which is more fully set forth in the claims at the end of this disclosure.

As conducive to a more thorough understanding of certain features of my invention, it may be noted at this point that the stainless steels, illustratively chromium-nickel stainless steels, are those having substantial chromium content. Typically these may respond to an analysis of approximately 10% to 30% or more chromium, nickel up to approximately 30% or more, and the remainder substantially all iron. Desired alloying additions may be employed in small amounts for specified purposes, illustratively copper, molybdenum, tungsten, tantalum, columbium, titanium, vanadium, silicon, manganese, aluminum, sulphur, selenium, or the like. While specialized instances may be cited wherein the carbon content of such steels are high, usually it is desirable and even essential that the carbon content be kept extremely low.

Moreover, my invention has special application to the effective reclamation of metal scrap, particularly stainless steel metal scrap as is found about the melt shop and the rolling mill and in the various customer plants. In the melt shop, for example, there is considerable scrap in the form of ingot butts, crop ends and the like, while in the processing of bar stock, for example, about 25% to 30% of the metal results in scrap. Increase in the number of operational steps to which the stainless steel bars and the like are subjected is attended by corresponding increase in the amount of scrap resulting. Consequently, some 40% to 50% of scrap attends the production of sheet and strip, while upwards of 60% to 70% loss results where the sheet or strip is subjected to further forming operations of intricate pattern, illustratively machine or burner parts, automobile trim and the like. Sale of this scrap found in the customer plant, and the utilization of scrap in the melt shop, contributes towards a reduction in the operational costs of the plant. Thus the effective use of the metal scrap has highly practical advantage.

And, I find that in stainless steel melting practice, it is desirable, from a practical and economical standpoint, to employ a balanced furnace charge comprising the two radically divergent sources of chromium metal, stainless steel scrap and chrome ore, both of which exist in abundant quantity at comparatively low cost. But, where stainless steel scrap metal and chrome ore in pulverized form are charged into the ordinary electric furnace of the overhead electrode type, illustratively the well-known Heroult furnace, certain practical processing problems are encountered which must be resolved before maximum potential economies are realized.

One difficulty apparently results from the porosity of the raw materials employed, with the resultant entrapment of moisture therein. For it is essential that evolution of gas during the melting process be maintained at a minimum, and that as well, all gas which is evolved be eliminated from the melt. This essential attends upon the phenomenon that if gas is not eliminated from the molten metal, but is allowed to remain therein, either free or in occluded form, then upon teeming the molten metal into ingot molds, the gas is entrapped in the solidifying metal. It causes the metal to rise in the mold. The resulting ingots are porous, possessing gassy areas with non-uniform cross-sectional characteristics, unpredictable in nature, and displaying points of localized weakness and incipient failure.

Particularly desirable, I find, is the elimination of moisture from the melt, for if any traces are allowed to remain as water vapor, then under the intense heat of the electric arc, this moisture breaks down into its component hydrogen and oxygen. While the oxygen presents no particular difficulty, combining as it does with either the carbon or the metal of the melt, and passing off either to the atmosphere as a gas or into the slag as a metal oxide, the released hydrogen interposes extremely great difficulty. It is taken into the molten metal in uncombined form, later evidencing itself in the ingot mold upon solidification of the metal, and giving rise to the undesirable gassy qualities just referred to. Now, experience in actual melting practice conclusively demonstrates that a substantial amount of undesirable moisture is in the chrome ore employed, this formerly requiring a careful pre-drying of the ore.

While the pre-drying and pre-heating heretofore used effectively maintain moisture within required low limits, I find that these preliminary steps constitute an economical detriment of important magnitude, when viewed from the standpoints of time consumed and the plant space, equipment, storage and labor requirements. They add appreciably to production costs, while substantially curtailing production rate.

An important object of my invention, therefore, is to simplify the production of stainless steel according to accurate specification, and this with production of metal of uniform structure without the presence of gassy regions or other evidence of contamination by hydrogen or other gases, and conforming closely and accurately to specified low carbon content, all with structure without the presence of gassy regions or other evidence of contamination by hydrogen or other gases, and conforming closely and accurately to specified low carbon content, all with the elimination of pre-drying and pre-heating the raw materials for the furnace. In the practice of my process, I avoid the necessity of pre-drying and pre-treating the chrome ore by charging the ore in fine form onto the banks of the hot furnace in a layer of such thickness that the heat of the furnace walls is rapidly and effectively transmitted to the ore as it lies on the furnace banks, and the moisture thereby eliminated, all in a manner hereinafter more fully pointed out. A carbonaceous material together with iron oxide preferably is added to the charge to achieve a carbon boil and the elimination of any gases formed from the moisture. With this new procedure, I achieve in ready manner, in the initial or oxidizing phase of the process, a melt free of gas and yet reaching and adhering closely to required low carbon content, and this with the use of chrome ore which is inexpensive and readily available.

And now having reference more particularly to the practice of my process, it may be noted that my process may be used with any of the various available electric arc furnaces, from the small sizes to the large size Heroult furnaces, say from 5 to 75 ton capacity, wherein the electrodes are suspended overhead and extend downwardly into the region of the charge.

In the practice according to my invention, chrome ore is one of the important sources of chromium metal. Other sources of chromium such as stainless steel scrap are added to provide what may be termed a balanced charge. It will be recalled that in the initial phase of my process this chrome ore in fine form, this not exceeding about one-half inch size, the fine size being had naturally or as a result of a prior crushing operation, is charged onto the hot banks of the heated furnace in such manner as to drive off moisture content thereof without necessity of a preliminary drying and treating step. This, of course, requires that the walls and the banks of the furnace are initially at such temperature as will be effective in driving off this moisture content. Now, it is evident that where a first melt has already been completed, the metal tapped off, slag removed, and the furnace thereupon immediately re-charged, the furnace banks will be at required elevated temperature, say about 3000° F.

Upon initially starting the furnace, however, with the furnace cold, this condition will not be established, and scrap metal must initially be charged into the furnace and an arc struck thereacross so as to bring the furnace up to required operating temperature. It may be desirable to flux the charge preliminarily to hasten the production of pools of molten metal under the electrodes. In this manner, not only is the metal raised in temperature, but the same is likewise true of the walls of the furnace.

When the banks of the furnace itself are raised to sufficiently high temperature, as from tapping the previous heat of metal or by heating incident to initially melting a charge of scrap metal, then the chromium ore is charged onto the hot banks of the furnace in a layer, the thickness of which assures adequate moisture removal.

Since this chrome ore is of low thermal conductivity and in fine form, it is a poor conductor of heat. Now, should the layer of chrome ore as charged onto furnace banks be too great in thickness, then the heat from the furnace banks will not be transferred from those particles of the layer which lie closest the furnace banks to the exteriorly-lying particles. And, as a result, the moisture content of these outermost particles will not be eliminated. The moisture content of these particles will be retained, coming out at a later stage of the process and being carried into the melt to serve as a contaminating additive. It is apparent, therefore, that care must be observed that the thickness of this charging layer of chrome ore be retained below a certain critical value. On the other hand, care should be observed that the layer of chrome ore is of sufficient thickness to insure a sufficient amount of chrome ore in the charge, this resulting in maximum operating efficiency. For if the thickness of the layer is below the maximum value at which all moisture can be driven off during the initial melting period, then maximum operating efficiencies of necessity will not be effected.

Accordingly, it is apparent that a certain critical amount of charge exists, which empirically I have determined, for a 16-ton Heroult furnace with furnace banks formed of chromite brick and displaying, during charge of chrome ore, a temperature of approximately 3000° F. to be about 10 inches in thickness, this amounting to about four hundred pounds per ton of steel.

Upon determination and calculation of the amounts, qualities and analysis of available scrap, the proportionate amounts by weight of each such addition as required for a melt of desired analysis is determined. To illustrate, and following the practice of my invention, in a particular melt where low carbon 18-8 stainless steel is sought, which illustratively is a steel analyzing about 18% chromium, 8% nickel, not more than 0.05% carbon, with manganese and silicon not exceeding about 0.5% and with phosphorus and sulphur present only as impurities, I charge the following materials into a 16-ton Heroult furnace:

| Materials | Quantity in Pounds |
|---|---|
| 3% nickel (steel scrap containing about 3% nickel) | 1,165 |
| 18-8 chromium-nickel stainless iron scrap | 18,000 |
| DSM (18-8 stainless steels of high sulphur content) | 1,000 |
| 12-35 chromium-nickel stainless steel scrap | 1,500 |
| 100% nickel | 335 |
| 16-2 chromium-nickel stainless steel scrap | 1,000 |
| High-carbon ferrochrome (70% chromium, 6% carbon) | 350 |
| Chrome ore (50% $Cr_2O_3$, 25% FeO) | 6,000 |
| Iron Ore (magnetite) | 4,800 |

In charging the furnace, I first charge substantial quantities of chrome ore on the banks of the furnace as more particularly dealt with hereinafter. Next, the scrap metal, representing typically the scrap available in the melt shop and in the customer plants, is charged onto the bottom of the furnace. I then charge the iron ore on top of the scrap. Where there is likelihood of excessive moisture content, which moisture content would be sufficient to require a pre-drying and preheating of iron ore according to existing furnace practice, then instead of charging the ore directly on top of the scrap, I charge it onto the banks of the furnace in manner like the chrome ore. In general, however, I find no excessive moisture in the iron ore which I employ, and it is sufficient to charge it onto the scrap metal but away from the furnace electrodes. The nickel-bearing ingredients are charged with the iron ore. Where large quantities of chrome ore are employed, the excess chrome ore is charged onto the steel scrap because, as previously noted, only a certain critical amount of the untreated ore may be charged onto the banks of the furnace.

The furnace electrodes are then applied to the scrap and an arc established directly across the metal. Carbon contamination from the electrodes is not detrimental at this stage of the process. Actually it is beneficial since any carbon carried into the charge is oxidized during the course of this initial melt-down oxidizing stage of the process, thereby flushing the bath with the carbon dioxide and perhaps carbon monoxide which is formed.

In laying down the ore on the banks of the furnace and in melting the steel scrap, this requiring about an hour and a quarter, substantially all moisture content of the chrome ore is effectively driven off and escapes to the atmosphere. By consequence, when it passes into the melt this chrome ore has already been freed of residual moisture. Thus, any appreciable hydrogen contamination of the melt from this source is effectively averted.

In general, in charging the furnace the ore is charged onto the furnace banks as fast as can possibly be accomplished. The limiting factors in this respect are available surface area of the furnace banks, the thickness of the layer of chrome ore and the rate of absorption by the ore of the heat from the furnace. It is apparent that this rate must not be so great as to chill the furnace below certain limiting values. As has been stated hereinbefore, at the outset of the charging process the furnace possesses a high degree of residual heat from the charge just tapped. And, it is this residual heat that tends to draw off the moisture. Where desired, as previously noted, additional ore is charged onto the steel scrap during the initial meltdown, this being melted by the heat of the electric arc which also serves to eliminate moisture. In this regard it is noted that by charging this ore after the melting has started, any ore that falls through the scrap goes into the bath that has formed and thereby is dried. Where the chrome ore is charged onto the scrap before the bath is formed, whatever falls through goes to build up the bottom and is inclined to introduce moisture into the process and gas into the metal.

In my process, the comparatively inexpensive high-carbon ferrochrome preferably is incorporated in the charge, in appreciable amounts as a further source of chromium and as a source of carbon. This ingredient ordinarily is charged onto the chrome ore around the banks while charging the iron ore. Not only does the use of this ingredient contribute appreciably towards lowering costs of materials as contrasted with the use of the low-carbon ferrochrome originally considered essential for the production of stainless steel, but as well its high-carbon content contributes effectively to the achievement of a vigorous carbon boil within the bath, a phenomenon most effective in eliminating hydrogen and other gaseous constituents of the melt. In fact, where economy dictates that the chromium additions be made only by way of chrome ore and stainless steel scrap, I find it advantageous where the ore is particularly damp or even on damp, humid days, to add a carbonaceous material such as crushed electrode butts, coke or pig iron to provide a carbon boil and the desired elimination of hydrogen from the melt. Such ore addition is particularly beneficial in the production of chromium-nickel stainless steel, the nickel scrap and especially the electrolytic nickel used apparently containing some hydrogen.

To insure adequate fluxing of the materials of the charge, I usually add during the earlier stages of the process the following ingredients:

| | Pounds |
|---|---|
| Fluorspar | 300 |
| Freshly-burnt lime | 300 |

I charge these onto chrome ore overlying the banks of the furnace. Here again, the rate of charge and thickness of the layer is such that all particles of the charge are rapidly brought to moisture-expelling temperature before reaching the bath itself.

The melt-down or oxidizing stage of my process is accomplished in about 2½ hours time, employing the charge as heretofore recited. Completion of this oxidizing period is determined by spot analysis to determine the carbon content. During this stage, the available carbon is oxidized to a desired low residual value. A substantial amount of the chromium and iron contained in the bath also is oxidized, this being carried over into the slag, producing a slag which becomes progressively thicker during the first or oxidizing stage, as more and more chromium is carried out of the melt, and into the slag, where for an efficient process it must be subsequently reclaimed.

This oxidation of carbon from the metal I have found to be greatly accelerated and rendered effective in achieving a commercially practicable process, by employing a high melt-down temperature. While there exists no reliable method, so far as I know, for determining precisely the temperature of the metal immediately underlying the slag blanket, I estimate that this temperature should be brought to approximately 3100° F. to 3250° F., a value some 150° to 200° higher than the temperatures ordinarily employed in the usual steel-making practices. Conveniently, I call this a temperature of super-heat.

A commercially feasible process requires substantially complete recovery of the iron and chromium from the slag in a subsequent reducing period. Accordingly, in this subsequent reducing stage of my process a substantial quantity of a non-carbonaceous reducing agent is charged into the furnace. This takes the form of ferrosilicon in amount chemically in excess of the oxides of the iron and chromium contained in the slag. The ferrosilicon is charged onto the slag overlying the molten metal and for the heat indicated above substantial recovery of iron and chromium from the slag is achieved with about 2350 pounds of 75% ferrosilicon.

Now it is to be recalled that silicon is a highly active ingredient with a strong affinity for iron and its alloy products. Accordingly, to minimize danger of silicon contamination of the metal during the reducing stage, and this despite the presence of silicon in excess of chemical requirements, and at the same time generally to improve the efficiency of the reducing action, I find it desirable to add burnt lime in an amount roughly ranging from about three to five times the total silicon content of the ferrosilicon, and charged along with the reducing agent.

After all of the ferrosilicon and lime have been added and have fused and completed their action upon the ingredients contained in the slag and metal, and a substantially complete recovery of the oxides of both iron and chromium of the slag is achieved, as evidenced by the color of successive samples of slag taken from the furnace changing from a black to a light gray or green color, the reducing period is at an end. The iron and chromium from the slag are substantially completely recovered into the metal bath.

If desired, during the reducing stage, and along with the lime and ferrosilicon, may be charged say 300 pounds of ferromanganese to produce a required manganese content in the finished product.

Upon tapping after the required routine finishing slag treatment, the resultant product, for the example given, is found to have an ingot weight of 30,240 pounds. Shell and butt comprised another 100 pounds, making a total metal recovery of 30,340 pounds. Upon analysis, the finished product is found to analyze: Chromium 18.25%, nickel 8.67%, carbon 0.049%, manganese 1.17%, phosphorus 0.026%, and sulphur 0.018%, with remainder iron. In this typical heat requiring approximately five hours' time, the furnace log is as follows:

| Time | Episode |
| --- | --- |
| 12:50 | Chrome ore, iron oxide and scrap charged into furnace. |
| 3:25 | Lime, ferrosilicon and manganese charged. |
| 4:50 | Slag drawn off and finishing slag supplied. |
| 6:30 | Metal tapped. |

Total operation time: 5 hours, 40 minutes.

By my new process, I achieve the effective elimination of moisture from the charged ingredients and this without necessity of separate pre-drying and pre-heating operations. By this elimination of these two heretofore essential manipulative steps, the overall process is made more simple and less expensive. Important savings in time and labor are achieved. Danger of hydrogen contamination nevertheless is avoided, and likelihood of porous, gassy ingots from this cause is removed. Not only are important savings achieved in the avoidance of preliminary manipulative steps, but no particular problem is added in charging the chromium ore and the lime onto the banks of the furnace.

Moreover, in my process a metal bath is quickly achieved, substantially free from gas contamination and responding closely and consistently to required low carbon analysis. Moreover, my new practice makes it entirely feasible to recover substantially all of the chromium and iron contents of the slag, and this in the substantial absence of silicon contamination.

My new practice makes it possible to produce clean, sound stainless steel in rapid, inexpensive and economical manner, utilizing for this purpose the larger and more efficient types of electric furnaces, and with minimum demand of plant, time and labor. All these, as well as many other highly practical advantages attend upon the practice of my invention.

It is apparent that once the broad aspects of my invention are disclosed, many embodiments thereof will readily suggest themselves. And that as well, many modifications of the present embodiment will come to hand, all falling within the scope of my invention as defined in the appended claims. Accordingly, I intend that the foregoing disclosure be considered simply as illustrative of the underlying thought of my invention, and that it not be construed as limitative.

I claim as my invention:

1. In the production of stainless steel in an electric arc furnace wherein a charge is melted down under oxidizing conditions and the metallic content of the reducible oxides recovered in a subsequent reducing operation and the heat of steel tapped thereafter, the art which comprises, in introducing the charge, charging moisture-containing chrome ore onto the hot banks of the furnace in such thickness that substantially all moisture content of the ore is driven off, and charging into the furnace a carbonaceous material to flush from the metal bath which is formed any gas resulting from the decomposition of any moisture remaining.

2. In the production of chromium-nickel stainless steel in an electric arc furnace wherein a charge is melted down under oxidizing conditions and the metallic content of the reducible oxides recovered in a subsequent reducing operation and the heat of steel tapped thereafter, the art which comprises, in introducing the charge, charging moisture-containing chrome ore in fine form onto the hot banks of the furnace in such thickness that substantially all moisture content of the ore is driven off, charging steel scrap onto the bottom of the furnace but away from the furnace electrodes, and charging onto the scrap a carbonaceous material, iron oxide and nickel-bearing ingredients, the reaction of which aids the elimination of any gas resulting from any moisture remaining.

3. In the production of stainless steel in an electric arc furnace wherein a charge is melted down under oxidizing conditions and the metallic content of the reducible oxides recovered in a subsequent reducing operation and the heat of steel tapped thereafter, the art which comprises, in introducing the charge, charging moisture-containing chrome ore in fine form onto the hot banks of the furnace in such thickness that substantially all moisture content of the ore is driven off, charging steel scrap onto the bottom of the furnace, charging iron oxide onto the scrap, and charging high carbon ferrochrome onto the scrap to facilitate melting of the same, yet permitting egress of moisture from the ore and the flushing from the molten metal formed any gas resulting from the decomposition of any moisture remaining.

4. In the production of stainless steel in an electric arc furnace wherein a charge is melted down under oxidizing conditions and the metallic content of the reducible oxides recovered in a subsequent reducing operation and the heat of steel tapped thereafter, the art which comprises, in introducing the charge, charging moisture-containing chrome ore onto the hot banks of the furnace in such thickness that substantially all moisture content of the ore is driven off, charging steel scrap onto the bottom of the furnace, and after partially melting the scrap, charging additional moisture-containing chrome ore onto the scrap remaining, the heat of the scrap serving to eliminate moisture.

References Cited in the file of this patent

UNITED STATES PATENTS

| Number | Name | Date |
| --- | --- | --- |
| 1,954,400 | Arness | Apr. 10, 1934 |
| 2,455,073 | Loveless | Nov. 30, 1948 |
| 2,546,340 | Hilty | Mar. 27, 1951 |

OTHER REFERENCES

Open Hearth Proceedings, vol. 27, pages 172 and 173. Published in 1944 by the American Society of Mining and Metallurgical Engineers.